Aug. 19, 1924.
J. R. QUAIN
1,505,669
APPARATUS FOR THE PRODUCTION OF OZONE
Filed Dec. 8, 1919
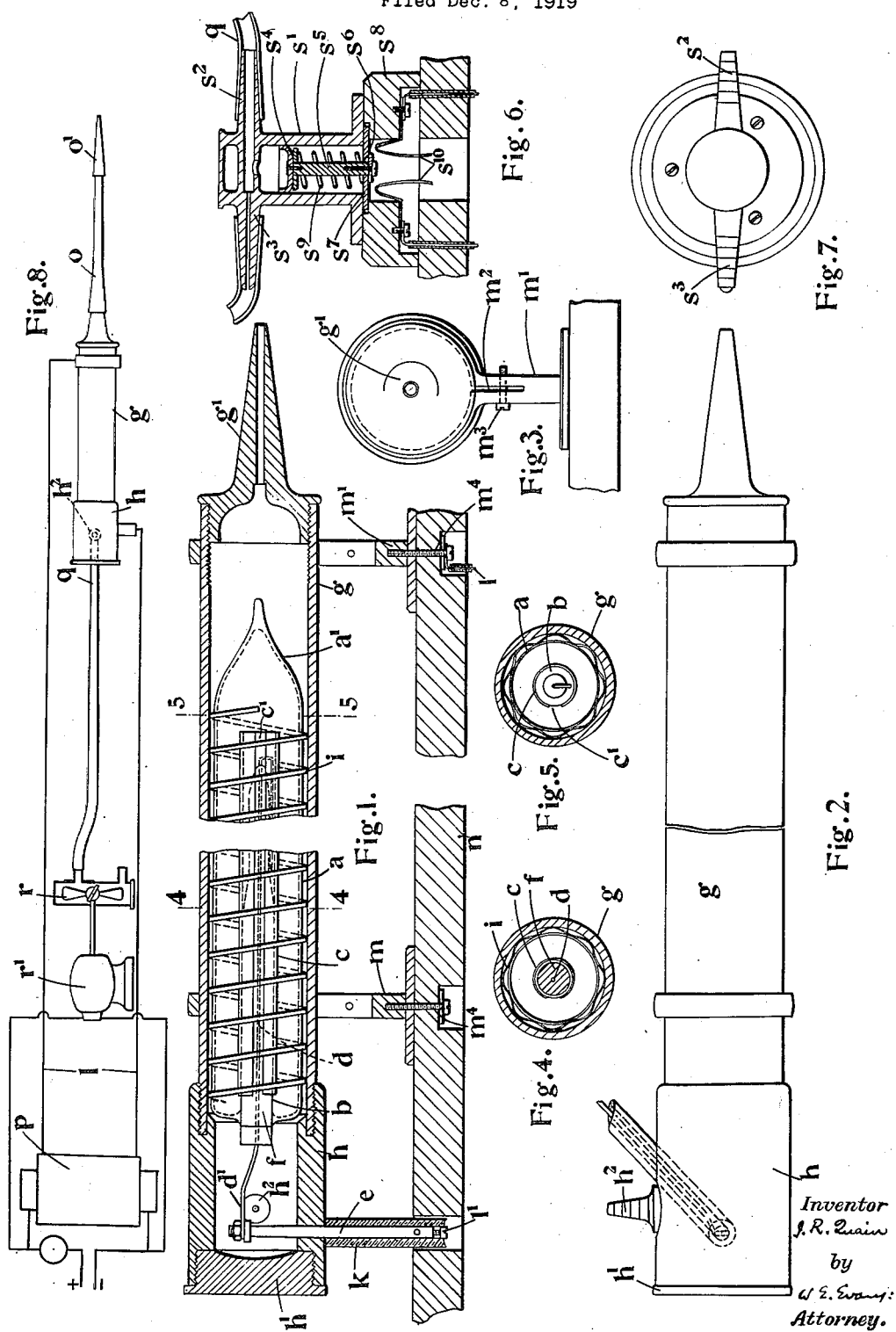
Inventor
J. R. Quain
by
W. E. Evans
Attorney.

Patented Aug. 19, 1924.

1,505,669

UNITED STATES PATENT OFFICE.

JOHN ROBERT QUAIN, OF LONDON, ENGLAND.

APPARATUS FOR THE PRODUCTION OF OZONE.

Application filed December 8, 1919. Serial No. 343,370.

*To all whom it may concern:*

Be it known that I, JOHN ROBERT QUAIN, a subject of the King of Great Britain and Ireland, residing at 17 Victoria Street, London, S. W., England, have invented certain new and useful Improvements Relating to Apparatus for the Production of Ozone, of which the following is a specification.

This invention relates to apparatus for the production of ozone.

The invention has for its object to produce ozone by the silent efflorescent exudation of ultra-violet rays and to produce ozone uncontaminated with nitrogen compounds such as are produced with an apparatus operating with a brush discharge.

One of the objects of the invention is to produce ozone for the antiseptic treatment of wounds and generally for oxidizing purposes or for purposes for which ozone is indicated.

The utilization of silica as the dielectric in my ozone-producing invention is not only highly advantageous but is essential to a maximum production of ozone which shall be free from oxides of nitrogen. Such maximum production of substantially pure ozone is due to the uniform composition of silica whereby it is free from the danger of developing fissures in which local heating may occur to produce oxides of nitrogen and, eventually, destruction of the dielectric. A further important characteristic of silica is its permeability to ultra-violet light of short wave length, as distinguished from glass, which is impermeable to such radiations. A further important characteristic of silica is that it insures discharge of a uniform character over the surface and, therefore, insures the production of greater quantities of ozone.

According to the invention I enclose one of the electrodes within an envelope of silica and I provide the electrodes of considerable area substantially co-extensive in length in the form for example of a tube or of a wire helix mounted within the silica envelope.

According to one modification, the central electrode may take the form of a tube and it may be mounted within a cylindrical envelope of silica, being either fitted upon a central inwardly protruding tube of silica disposed within the surrounding silica envelope, or it may be provided as a tube of larger diameter to fit in contact with the inner surface of the silica envelope. Or again the central electrode may be provided as a wire helix extending the length of the envelope. Similarly the outer electrode may take the form of a metal tube disposed in proximity to the outer surface of the silica envelope leaving an intermediate annular space over which air or oxygen may be passed, the surrounding metal tube thus forming a conduit for the air or oxygen to be passed over the silica envelope. Such tube may have the interior surface enamelled to protect it from oxidation or the electrode may be formed as a glass tube suitably coated on the exterior with a metallic conductor or carrying a metal casing or wire filament. Or again the outer electrode may take the form of a helix of metal wire or ribbon and this wire or ribbon may be corrugated, or the wire may first be formed into a helix of small diameter and in this helical form, helically wound around the silica envelope. Or again the outer electrode may take the form of a perforated tube.

The silica envelope is evacuated or a low degree of vacuum maintained therein, or the envelope may be filled with some inert gas.

The invention comprises the features which are hereinafter described.

The invention is illustrated in the accompanying drawings in which—

Figure 1 is a longitudinal sectional elevation of a simple form of apparatus provided according to the invention.

Figure 2 is a plan corresponding to Figure 1.

Figure 3 is a corresponding end elevation.

Figure 4 is a detail section on the line 4—4 of Figure 1, and

Figure 5 is a detail section on the line 5—5 of Figure 1.

Figure 6 is a sectional elevation of an automatically operating switch that may be used in connection with the apparatus illustrated in Figures 1 to 5, and Figure 7 is a plan view corresponding to Figure 6.

Figure 8 is a diagram showing the connection and operation of the apparatus illustrated in Figures 1 to 7.

In carrying the invention into effect as illustrated in the accompanying drawings, I provide a completely enclosed cylindrical casing $a$ of silica carrying an inwardly protruding tubular part $b$ of silica of smaller diameter than the casing $a$, and this smaller tubular part $b$ may serve for carrying within the casing $a$ an electrode in the form of a copper or other metal tube $c$, or in the form of a filament; and the electrode $c$ is connected to a wire $d$. The wire $d$ is at one end connected to the electrode $c$, and at its opposite end may conveniently be formed into a loop $d^1$ or otherwise formed for connection to the contact pillar $e$ which is provided with a shoulder on which the loop may rest and with a screw-threaded end to receive a clamping nut. The wire $d$ passes through the tubular part $b$ and through a seal $f$ of bitumen, pitch, or other suitable material, and the annular space between the casing $a$ and the tubular part $b$ may have a comparatively low degree of vacuum or it may be filled with an inert gas such as hydrogen.

The electrode $c$ is formed as a cylinder but with a slot or gap $c^1$ and is adapted to be retained upon the part $b$ by a close fit. The tubular part $b$ is first formed, it is then welded to the end of the casing $a$, the wire $d$ is connected to the electrode $c$ and the electrode $c$ mounted in position upon the tubular part $b$ and the seal made at $f$. The front end $a^1$ of the casing $a$ is then formed for connection to a vacuum pump, and the front end is closed in a manner similar to that usual in the manufacture of incandescent lamps.

The element thus produced comprising the parts $a$, $b$ and $c$ is mounted within a surrounding tube $g$ which may be for instance of nickel chrome or other metal and this latter may be screwed into a cylindrical socket $h$ of vulcanite or other insulating material. The socket $h$ may be provided at the rear with a screw threaded closing cap $h^1$, removable for the purposes of inspection.

The casing $a$ may have applied around it a helix of metal ribbon $i$, which may be corrugated, so that it may thus occupy the annular space between the slica casing $a$ and the surrounding metal tube $g$ and serve to support the silica casing $a$ concentrically therein. A contact post $e$ of copper or other conductor protrudes through the cylindrical socket $h$ into such position that the loop $d^1$ may be applied upon its inwardly protruding extremity, and the contact post $e$ may have applied upon it a tube $k$ of insulating material such as india-rubber, and the wire $l$ in the secondary circuit of an induction coil may pass through a hole at the lower end of the contact post $e$, and be secured therein by such means as a contact screw $l^1$.

The surrounding metal tube $g$ and the socket $h$ may be supported by metal pillars $m$ $m^1$ upon a base plate $n$. The pillars are provided with a circular part or ring to surround the metal tube $g$, and the stem of the pillars may be slit at $m^2$, and a screw threaded pin $m^3$ transversely passed therethrough for the purpose of binding the circular part or ring of the pillars tightly around the metal tube $g$. The respective pillars $m$ $m^1$ are secured upon the base plate $n$ by means of screws $m^4$ passing through from the under-side of the base plate $n$, and one of the screws $m^4$ is advantageously used for the connection of the wire $l$ of the secondary circuit of the induction coil. At the front end of the metal tube $g$ a nozzle fitting $g^1$ is mounted.

Where the apparatus is to be used for the treatment of wounds and for similar purposes, a rubber or other flexible tube $o$ may be fitted to the nozzle $g^1$, and its opposite end may serve to carry a nozzle fitting $o^1$ for the application of ozone to the wound or to the part to be treated with the gas.

The cylindrical socket $h$ is provided with a laterally extending boss $h^2$ for the reception of a tube $q$ through which air or oxygen may be passed into the cylindrical socket $h$, thence through the annular space between the silica casing $a$ and the metal tube $g$. A fan $r$ operated by a small electro-motor $r^1$ may be used for the supply of air.

It will be understood that on the fan $r$ operating and on current passing through the secondary circuit $l$ of the induction coil $p$, a silent efflorescent exudation of ultra-violet rays is produced on the outer surface of the silica casing $a$, ozone being produced which passes outwardly through the nozzle $g^1$.

In cases where the air is fed to the tube $g$ by means of a hand-operated pump or rubber bulb, a switch $s$ is advantageously provided which operates to close the primary circuit of the induction coil $p$, on the pump or bulb operating to supply sufficient air or oxygen for the purposes of the production of ozone. The switch $s$ consists of a cylinder $s^1$ having integrally provided therewith a nozzle $s^a$ for the reception of the air supply pipe $q$, and the nozzle $s^3$, having a smaller bore than the nozzle $s^2$, for the supply of air through the tube $q$ to the ozone producing apparatus.

A piston $s^4$ is provided to slide in the cylinder $s^1$, and the piston $s^4$ is connected to the rod $s^5$ which latter has a contact plate $s^6$ at its lower end. A plate $s^7$ is mounted between the cylinder $s^1$ and the base $s^8$ upon which the cylinder is mounted, and the rod $s^5$ has a spiral spring $s^9$ surrounding it, and extending between the piston and the plate $s^7$.

When the pump or bulb is not operated the piston assumes the position indicated in Figure 6. On the pump or bulb being operated the pressure in the upper part of the cylinder above the piston $s^4$ is sufficient to overcome the force of the spiral spring $s^9$, and to cause the depression of the piston $s^4$ to such an extent that the contact plate $s^6$ passes downwardly, and its respective edges make contact with the oppositely disposed spring contact arms $s^{10}$ which are mounted within a cavity on the base $s^8$, and are connected in the primary circuit of the induction coil $p$, so that thus the circuit is completed.

It will be understood that when the pump or bulb is no longer operated, the spring $s^9$ causes the piston $s^4$ to pass to its uppermost position with the contact plate $s^6$ in position against the plate $s^4$, and out of contact with the spring contact arms $s^{10}$.

It will be understood that the nozzle fitting $o^1$ may be made of any suitable shape for administering or applying ozone. It may for example be provided of a shape suitable for the inhalation of the gas, or it may be formed convenient for the application of the gas to wounds, and such a nozzle or fitting may be adapted to be readily removed or replaced according to the particular use desired.

Where it is required that the gas shall diffuse in the position where the apparatus is placed, the second electrode may take the form of a helical ribbon or wire such as $i$ which is connected in the secondary circuit of the induction coil.

I claim:

1. Apparatus for the production of ozone by means of high-tension electrical energy comprising spaced-apart electrodes and a dielectric body composed of silica interposed between said electrodes with which at least one of said electrodes is in contact to act directly upon the air to be ozonized.

2. Apparatus for the production of ozone comprising two electrodes and a separating body of silica with which at least one of said electrodes makes contact at a plurality of points, and means for permitting air or oxygen to pass in contact with the surface of said separating body and with at least one of the electrodes.

3. Apparatus for the production of ozone comprising two electrodes and an evacuated or inert-gas-filled hollow body of silica containing one of said electrodes and the outer surface of which is engaged by the other electrode at a plurality of points, and means for conducting air or oxygen along the outer surface of said hollow body and in contact with the outer electrode.

4. Apparatus for the production of ozone comprising two electrodes and a separating body of silica with which one of the electrodes is in contact, and means for causing air or oxygen to pass along the surface of the silica body with which the electrode is in contact.

5. Apparatus for the production of ozone comprising two electrodes and an evacuated or inert-gas-filled hollow body of silica with the outer surface of which one of the electrodes makes contact at a plurality of points, and an envelope for the outer electrode to provide a conduit for the air or oxygen to be ozonized.

6. Apparatus for the production of ozone comprising two electrodes and a hollow evacuated or inert-gas-filled body of silica, one of the said electrodes being centrally mounted within said hollow body and the other electrode surrounding said body.

7. An apparatus for the production of ozone comprising an elongated, evacuated or inert-gas-filled envelope of silica and two electrodes respectively located inside and outside of said envelope and extending approximately from end to end thereof.

8. An apparatus for the production of ozone comprising an evacuated or inert-gas-filled silica envelope and two electrodes of considerable area, the one within and the other without said envelope, and means for directing the air or oxygen to be ozonized in contact with the outer electrode.

9. An apparatus for the production of ozone comprising an evacuated or inert-gas-filled tubular casing of silica, an electrode within said casing, and a second naked electrode surrounding said casing and in contact therewith.

JOHN ROBERT QUAIN.